United States Patent
Wang et al.

(10) Patent No.: US 10,021,720 B2
(45) Date of Patent: Jul. 10, 2018

(54) METHOD FOR ESTABLISHING MILLIMETRIC WAVE RADIO COMMUNICATION LINK AND TERMINAL DEVICE

(71) Applicant: ZTE CORPORATION, Shenzhen, Guangdong Province (CN)

(72) Inventors: Qian Wang, Shenzhen (CN); Lin Chen, Shenzhen (CN); Zhong Yu, Shenzhen (CN); Zhou Zhi, Shenzhen (CN)

(73) Assignee: ZTE Corporation, Shenzhen (CN)

(*) Notice: Subject to any disclaimer, the term of this patent is extended or adjusted under 35 U.S.C. 154(b) by 271 days.

(21) Appl. No.: 14/892,721

(22) PCT Filed: Aug. 16, 2013

(86) PCT No.: PCT/CN2013/081622
§ 371 (c)(1),
(2) Date: Nov. 20, 2015

(87) PCT Pub. No.: WO2013/189344
PCT Pub. Date: Dec. 27, 2013

(65) Prior Publication Data
US 2016/0174258 A1 Jun. 16, 2016

(30) Foreign Application Priority Data
May 22, 2013 (CN) .......................... 2013 1 0192249

(51) Int. Cl.
*H04W 74/08* (2009.01)
*H04W 16/28* (2009.01)
(Continued)

(52) U.S. Cl.
CPC ....... *H04W 74/0816* (2013.01); *H04W 16/28* (2013.01); *H04W 76/14* (2018.02); *H04W 16/26* (2013.01); *H04W 64/006* (2013.01)

(58) Field of Classification Search
None
See application file for complete search history.

(56) References Cited

U.S. PATENT DOCUMENTS

| 7,720,036 | B2 * | 5/2010 | Sadri | ..................... H04W 16/28 370/338 |
| 9,084,260 | B2 * | 7/2015 | Maltsev | ............ H04W 72/0453 |

(Continued)

FOREIGN PATENT DOCUMENTS

| CN | 101583078 A | 11/2009 |
| CN | 102457930 A | 5/2012 |
| EP | 2405706 A1 | 1/2012 |

OTHER PUBLICATIONS

Zhon Fan Ed-Massimo Colonna et al: "Wireless networking with directional antennas for 60 GHz systems", Jun. 22-25, 2008, Toshiba Research Europe, Telecommunications Research Lab, 32 Queen Square, Bristol BS1 4ND, UK, XP031320062.

(Continued)

*Primary Examiner* — Charles C Jiang
*Assistant Examiner* — George Atkins, Jr.
(74) *Attorney, Agent, or Firm* — Plumsea Law Group, LLC

(57) ABSTRACT

Disclosed are a method for establishing a millimeter wave wireless communication link and a terminal device, wherein the method includes: a terminal source sending an omni-bearing request to send (ORTS) to a terminal sink, location information of the terminal source relative to a mediation device obtained by the terminal source performing signaling interaction with the mediation device being carried in the ORTS; after sending the ORTS, if a directional clear to send (Continued)

sent by the terminal sink according the location information is received, the terminal source determining a direction of the terminal sink according to an angle of arrival of the directional clear to send, establishing a line of sight link with the terminal sink; if an omnibearing clear to send sent by the terminal sink is only received, the terminal source establishing a relay link with the terminal sink by using the mediation device as a relay node.

14 Claims, 5 Drawing Sheets

(51) Int. Cl.
*H04W 76/14* (2018.01)
*H04W 16/26* (2009.01)
*H04W 64/00* (2009.01)

(56) References Cited

U.S. PATENT DOCUMENTS

| | | | |
|---|---|---|---|
| 9,219,307 B2* | 12/2015 | Takahashi | G01S 3/38 |
| 2009/0213901 A1 | 8/2009 | Berens | |
| 2010/0246549 A1* | 9/2010 | Zhang | H04W 74/0816 |
| | | | 370/338 |
| 2011/0268097 A1 | 11/2011 | Agrawala | |
| 2011/0286403 A1* | 11/2011 | Jain | H04W 74/0816 |
| | | | 370/329 |
| 2011/0287796 A1* | 11/2011 | Jain | H04W 72/046 |
| | | | 455/509 |
| 2012/0243638 A1 | 9/2012 | Maltsev et al. | |
| 2012/0320763 A1* | 12/2012 | Hong | H04B 5/0081 |
| | | | 370/246 |
| 2013/0157578 A1* | 6/2013 | Nanda | H01Q 1/246 |
| | | | 455/63.4 |
| 2013/0157660 A1* | 6/2013 | Awad | H04W 72/046 |
| | | | 455/435.1 |
| 2014/0162655 A1* | 6/2014 | Hong | H01Q 21/061 |
| | | | 455/436 |
| 2014/0274056 A1* | 9/2014 | Hyde | H04W 48/18 |
| | | | 455/436 |
| 2014/0334387 A1* | 11/2014 | Doppler | H04W 74/0816 |
| | | | 370/329 |

OTHER PUBLICATIONS

European Search Report dated Mar. 30, 2016 in European Patent Application No. 13806583.4.
The International Search Report and Written Opinion dated Feb. 27, 2014 in Application No. PCT/CN2013/081622.

* cited by examiner

METHOD FOR ESTABLISHING MILLIMETRIC WAVE RADIO COMMUNICATION LINK AND TERMINAL DEVICE

CROSS-REFERENCE TO RELATED APPLICATION(S)

This application is the U.S. National Phase application of PCT application number PCT/CN2013/081622 having a PCT filing date of Aug. 16, 2013, which claims priority of Chinese patent application 201310192249.2 filed on May 22, 2013, the disclosures of which are hereby incorporated by reference.

TECHNICAL FIELD

The present document relates to the field of wireless communication technology, and particularly, to a method for establishing a millimeter wave wireless communication link and a terminal device.

BACKGROUND OF RELATED ART

The 60 GHz wireless communication technology is a millimeter wave wireless communication technology in which the transmission bandwidth is high and the transmission rate can reach a gigabit-level, and its typical application scenario is mainly an indoor environment. At 60 GHz frequency band, electromagnetic wave propagation shows a characteristic like light, that is, propagation beams of the electromagnetic wave are too narrow and have difficulty penetrating obstacles, and thus the antenna array and beamforming technology is adopted for the 60 GHz antenna, enabling beams to bypass the obstacles along a line of sight or a reflection path according to a specified direction to arrive at the receiving end.

The current 60 GHz beamforming typically needs to find a best link according to a tree search process of gradually converting from a rough scan at a sector level to an accurate scan at a beam level between a source and a sink. When there is interference in the line of sight (LOS) between the source and the sink, for example, the furniture and movement of personnel at the indoor environment cause an obstacle to the beams, the tree search process will take more time and even is unable to converge, thereby the link cannot be established between the source and the sink. Moreover, the beamforming will cause interference to other devices which are performing communication in a large-scale sector-level search process.

SUMMARY OF THE INVENTION

The technical problem to be solved by the present document is to provide a method for establishing a millimeter wave wireless communication link and a terminal device, which can rapidly establish the millimeter wave communication link under both conditions that there is inference or no interference in the line of sight between a source and a sink.

To solve the above-mentioned technical problem, a method for establishing a millimeter wave wireless communication link in the present document, comprises:

a terminal source sending an omnibearing request to send to a terminal sink, carrying location information of the terminal source relative to a mediation device obtained by the terminal source performing signaling interaction with the mediation device in the omnibearing request to send;

after sending the omnibearing request to send, if a directional clear to send sent by the terminal sink according to the location information is received, the terminal source determining a direction of the terminal sink according to an angle of arrival of the directional clear to send, establishing a line of sight link with the terminal sink; if an omnibearing clear to send sent by the terminal sink is only received, the terminal source establishing a relay link with the terminal sink using the mediation device as a relay node.

Preferably, the terminal source obtaining the location information of the terminal source relative to the mediation device by the terminal source performing the signaling interaction with the mediation device, comprises:

the terminal source performing the signaling interaction with the mediation device through a low frequency band communication module, to determine a first angle range;

after the first angle range is determined, the terminal source performing the signaling interaction with the mediation device by a millimeter wave communication module sending a plurality of directional beams in different directions, to determine the location information of the terminal source relative to the mediation device within the first angle range.

Preferably, the terminal source obtaining the location information of the terminal source relative to the mediation device by performing signaling interaction with the mediation device is performed in the following one or more situations:

when the terminal source accesses a system network:

when the terminal signal source performs periodically, to reach a performing period;

when the terminal source detects that a displacement occurs;

when a user equipment initiates a request to send.

Preferably, further comprising:

after receiving the directional clear to send, the terminal source judging whether a signal reliability judgment parameter of the received directional clear to send is greater than a preset receiving threshold, and if the signal reliability judgment parameter of the received directional clear to send is greater than the preset receiving threshold, determining that the received directional clear to send is a reliable directional clear to send;

if the terminal source receives a plurality of reliable directional clear to send, the terminal source selecting a directional clear to send with a maximum signal reliability judgment parameter, and determining the direction of the terminal sink according to the angle of arrive of the directional clear to send with the maximum signal reliability judgment parameter.

Preferably, in the process of the terminal source establishing the relay link with the terminal sink using the mediation device as the relay node, millimeter wave communication between the terminal source and the mediation device and millimeter wave communication between the terminal sink and the mediation device both are performed according to the location information of each other obtained by performing the signaling interaction.

Preferably, the terminal source sends the omnibearing request to send to the terminal sink through a low frequency band communication module; establishes the relay link with the terminal sink by establishing the line of sight link with the terminal sink through a millimeter wave communication module or by using the mediation device as the relay mode.

A method for establishing a millimeter wave wireless communication link comprises:

a terminal sink receiving an omnibearing request to send sent by a terminal source, resolving to obtain location information of the terminal source relative to a mediation device obtained by the terminal source performing signaling interaction with the mediation device and carried in the omnibearing request to send;

the terminal sink sending a directional clear to send, and sending an omnibearing clear to send to the terminal source according to the location information.

Preferably, the terminal sink sending the directional clear to send to the terminal source according the location information, comprises:

the terminal sink sending one directional clear to send or sending a plurality of directional clear to send in different directions according to the location information within a second angle range.

Preferably, the terminal sink sends the directional clear to send to the terminal source through a millimeter wave communication module; and sends the omnibearing clear to send to the terminal source through a low frequency band communication module.

A terminal device comprises a location information unit, a request unit, and a link establishing unit, wherein:

the location information unit is configured to obtain location information of the terminal device relative to a mediation device by performing signaling interaction with the mediation device;

the request unit is configured to send an omnibearing request to send to a terminal sink, carry the location information of the terminal device relative to the mediation device obtained by the location information unit performing signaling interaction with the mediation device in the omnibearing request to send;

the link establishing unit is configured to, after the request unit sends the omnibearing request to send, if a directional clear to send sent by the terminal sink according the location information is received, determine a direction of the terminal sink according to an angle of arrival of the directional clear to send, establish a line of sight link with the terminal sink; if an omnibearing clear to send sent by the terminal sink is only received, establish a relay link with the terminal sink using the mediation device as a relay node.

Preferably, the location information unit is configured to perform the signaling interaction with the mediation device through a low frequency band communication module, to determine a first angle range; after the first angle range is determined, perform the signaling interaction with the mediation device by the millimeter wave communication module sending a plurality of directional beams in different directions, to determine the location information of the terminal device relative to the mediation device within the first angle range.

Preferably, the link establishing unit is further configured to, after the directional clear to send is received, judge whether a signal reliability judgment parameter of the received directional clear to send is greater than a preset receiving threshold, if the signal reliability judgment parameter of the received directional clear to send is greater than the preset receiving threshold, determine that the received directional clear to send is a reliable directional clear to send; if a plurality of reliable directional clear to send are received, select a directional clear to send with a maximum signal reliability judgment parameter, to determine the direction of the terminal sink according to the angle of arrival of the directional clear to send with the maximum signal reliability judgment parameter.

Preferably, the request unit is configured to send the omnibearing request to send to the terminal sink through the low frequency band communication module;

the link establishing unit is configured to establish the relay link with the terminal sink by the millimeter wave communication module establishing the line of sight link with the terminal sink or by using the mediation device as the relay mode.

A terminal device comprises a receiving unit, a resolution unit, and a response unit, wherein:

the receiving unit is configured to receive an omnibearing request to send sent by a terminal source;

the resolution unit is configured to resolve to obtain location information of the terminal source relative to a mediation device obtained by the terminal source performing signaling interaction with the mediation device and carried in the omnibearing request to send;

the response unit is configured to send a directional clear to send, and send an omnibearing clear to send to the terminal source according to the location information.

Preferably, the response unit is configured to send one directional clear to send or send a plurality of directional clear to send in different directions according to the location information within a second angle range.

Preferably, the response unit is configured to send the directional clear to send to the terminal source through a millimeter wave communication module; send an omnibearing clear to send to the terminal source through a low frequency band communication module.

In conclusion, the terminal device and the mediation device in the embodiment of the present document obtain the relative location information by the signaling interaction, use a media access control protocol in which omnibearing communication and directional communication are combined to assist in completing the beamforming, and compared with the prior art, the embodiment of the present document has following advantages:

(1) the multi-frequency band physical layer coincides with the evolution line of the millimeter wave communication (60 GHz) standard, which will not increase the overhead of the hardware;

(2) the mediation device mostly is suspended on a high fixed position at indoors, the terminal device interacts with the mediation device, avoiding the interference to other devices;

(3) the directional media access control (MAC) protocol with very narrow beam (DOTS) helps to judge the shielding situation of the line of sight link.

PREFERRED EMBODIMENTS OF THE INVENTION

The embodiments of the present application are described in details in conjunction with the accompanying drawings hereinafter. It should be illustrated that, in the case of no conflict, the embodiments in the present application and features in these embodiments can be combined with each other arbitrarily.

In consideration that, when there is interference in the line of sight (LOS) between the terminal source and the terminal sink, a link cannot be established between the terminal source and the terminal sink, if the terminal source and the terminal sink can acquire location information and communication link shielding situation of each other, it will undoubtedly offer help in establishment of the link between the terminal source and terminal sink, the terminal source and terminal sink can simplify the tree search process of the beamforming or select to access non line of sight (NLOS) directly according to the above information to evade the link block.

Figure 1:
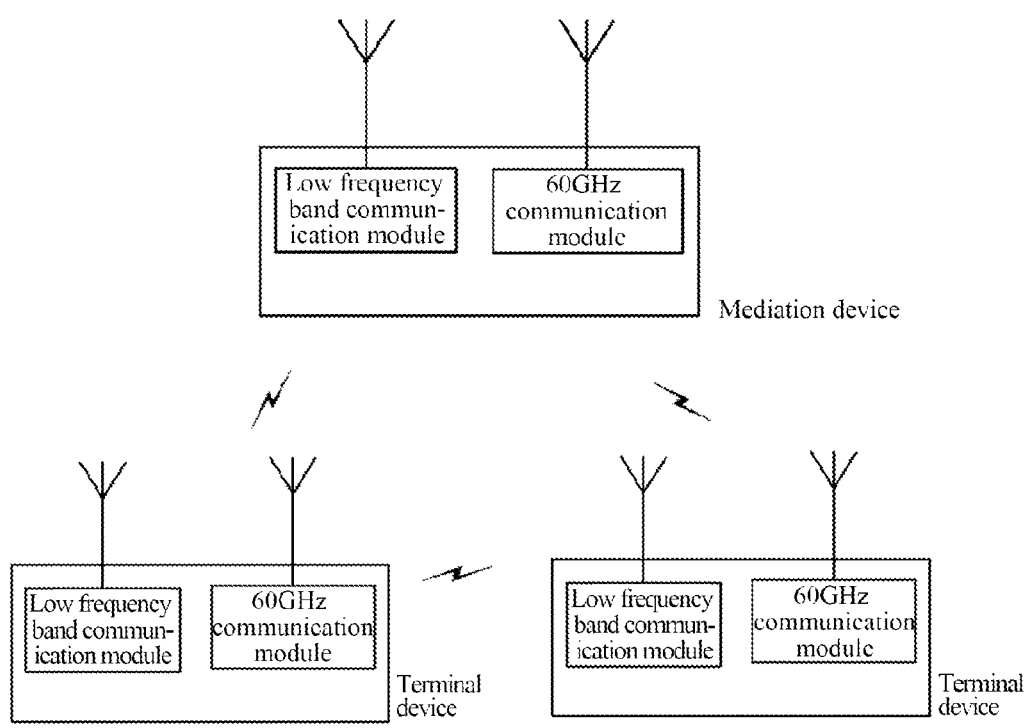
FIG. 1 is an architecture diagram of a millimeter wave wireless communication system according to one embodiment of the present document.

As shown in FIG. 1, the millimeter wave wireless communication system of this embodiment comprises at least one mediation device and a plurality of terminal devices, both the terminal source and the terminal sink belong to the scope of the terminal devices, wherein:

the mediation device is used for obtaining the location information of the terminal devices, which can be taken as a relay node of a communication link. The mediation device at least comprises a low frequency band communication module and a millimeter wave communication module (e.g., 60 GHz communication module).

The low frequency band communication module is used for the low-frequency (e.g., 2.4 GHz or 5 GHz of the Wi-Fi) communication to send an omnibearing beam and a directional beam with a relatively wide lobe width; the 60 GHz communication module is used for 60 GHz communication to send a directional beam with a relatively narrow lobe width.

The terminal devices at least comprise a low frequency band communication module and a millimeter wave communication module (e.g., 60 GHz communication module).

The method for establishing the millimeter wave wireless communication link of this embodiment will be described in the following two parts: (1) the terminal source and the terminal sink performing MAC protocol interaction, to establish the millimeter wave wireless communication link; (2) the terminal devices and the mediation device performing signaling interaction, to obtain the location information.

Figure 2:
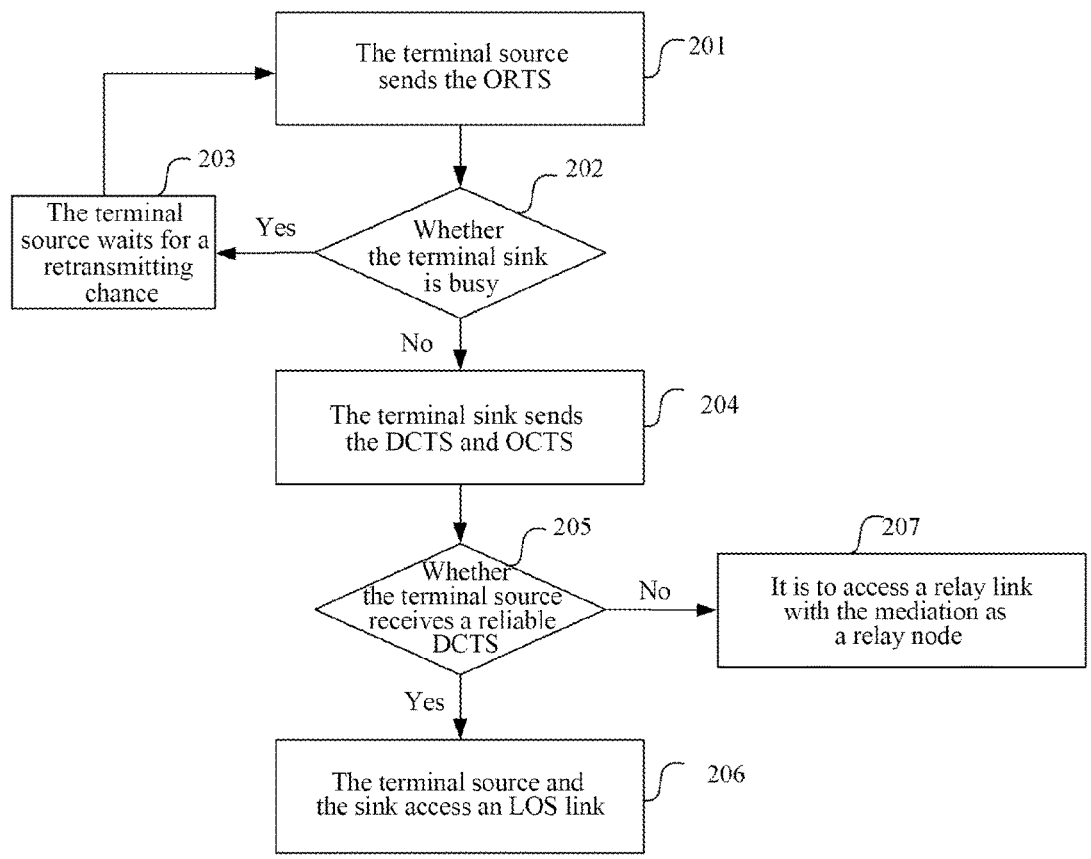
FIG. 2 is a flowchart of a method for establishing a millimeter wave wireless link according to the present document.

As shown in FIG. 2, in the method for establishing the millimeter wave wireless communication link of this embodiment, the terminal source and terminal sink performing the MAC protocol interaction, to establish the millimeter wave wireless communication link, comprises:

in step 201, the terminal source sends an omnibearing request to send (ORTS) to the terminal sink through the low frequency band communication module, the location information of the terminal source relative to the mediation device being carried in the omnibearing request to send, and waits for a response of the terminal sink;

in this embodiment, the omnibearing request to send carries the above location information on the basis of including contents required by a control frame of a request to send (RTS) of 802.11.

in step 202, it is to judge whether the terminal sink is in a busy state, if the terminal sink is in the busy state, it is to perform step 203; and if the terminal sink is in an idle state, it is to perform step 204;

in step 203, the terminal sink does not make a response, the terminal source waits for a chance for retransmitting the ORTS (it is consistent with the 802.11 mechanism);

in step 204, the terminal sink resolves the ORTS to obtain the location information of the terminal source carried in the ORTS, sends a directional clear to send (DOTS) to the terminal source through the millimeter wave communication module according to the location information of the terminal source and simultaneously sends an omnibearing clear to send (OCTS) through the low frequency band module to announce that the communication can be performed;

in step 205, the terminal source judges whether the reliable directional clear to send is received, if the reliable directional clear to send is received, it is to perform step 206; otherwise, it is to perform step 207;

in step 206, the terminal source determines the direction of the sink according to the angle of arrival of the DOTS, and establishes an LOS link with the terminal sink through the millimeter wave communication module;

in step 207, if the terminal source just receives the omnibearing clear to send (OCTS), the terminal source establishes the relay link with the terminal sink using the mediation device as a relay node through the millimeter wave communication module.

In this embodiment, the terminal device performing the signaling interaction with the mediation device, to obtain the location information, comprises:

in step a, the terminal source performs the signaling interaction with the mediation device through the low frequency band communication module, to obtain rough location information;

in step b, in the range of the rough location information, it is to use the millimeter wave communication module to send multiple directional beams in different directions to perform the signaling interaction with the mediation device, to obtain accurate location information in the range of the rough location information.

The location information of the terminal device can be represented in the form of an angle, coordinate, etc., using the mediation device as a coordinate origin.

Figure 3:
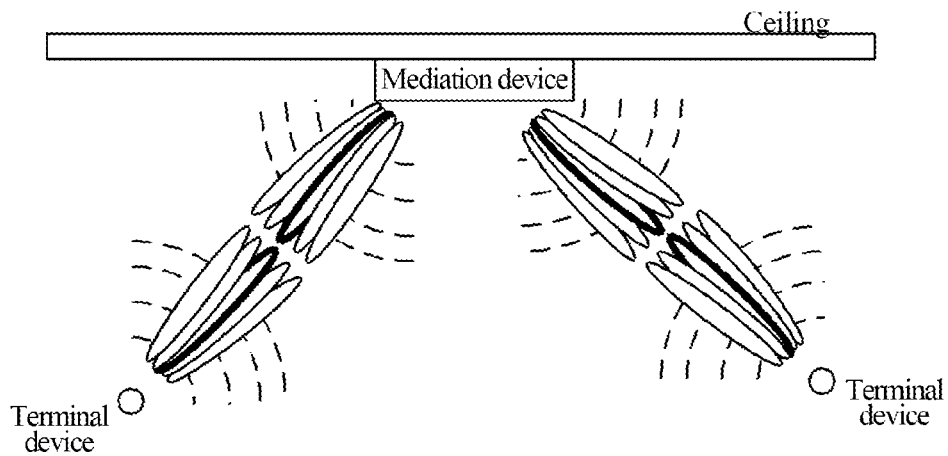
FIG. 3 is a schematic diagram of signaling interaction of a terminal device with a mediation device according to the present document.

As shown in FIG. 3, the terminal device performs the signaling interaction with the mediation device through the low frequency band communication module, since the directional precision of the low frequency band communication module is low, only the rough location information of two parties of communication can be determined, i.e., a first angle range is obtained. In the first angle range, the two parties of communication further use the 60 GHz communication module to continuously send a plurality of directional beams with different directions to perform the signaling interaction, to determine the location information of the terminal source relative to the mediation device within the first angle range, and obtain the accurate location information of the terminal device relative to the mediation device.

The terminal device and the mediation device can send a plurality of narrow beams at an interval of the first beam direction angle increment $\Delta\alpha$ with the first angle range to perform the MAC signaling interaction, the sending order can be that each directional beam sent can have an interval $\Delta\alpha$ with a previous directional beam, and can also be that one of the plurality of directional beams at the interval of $\Delta\alpha$ is sent randomly each time; or further can be that a beam direction angle of the interval between each directional beam sent and the previous beam is different, and can also be partially the same or partially different.

The numerical value of the first beam direction angle increment $\Delta\alpha$ depends on the system overhead, the smaller $\Delta\alpha$ is, the higher the precision is, and the larger the system overhead is.

It should be noted that, the terminal device can perform the above steps of obtaining the location information when accessing the system network to determine the location information, and then depending on the situation of the system overhead, can perform the above steps of obtaining the location information to update the location information of the terminal at period T or when the terminal device takes place displacement or when the terminal device has a communication requirement.

Wherein, when various terminal devices perform the above steps of obtaining the location information at the period T, the system adopts a time division policy to avoid that the MAC signalings of the various terminal devices have conflict at the mediation device, for example, the time for the terminals $D_0 \sim D_s$ to perform the above steps of obtaining the location information are $nT+t_0 \sim nT+t_s$, respectively, while the situation that the terminal device takes place displacement or the terminal device has a communication requirement is a random situation, and the resident time of the signaling in each frame is very short, so the interference to the mediation device can be ignored. Moreover, in the above steps of obtaining the location information, the beam direction of the signaling interaction and the beam direction of the data communication between the terminal devices are usually not in the same plane, so it will not cause interference to other terminal devices which are performing data communication.

Figure 4:
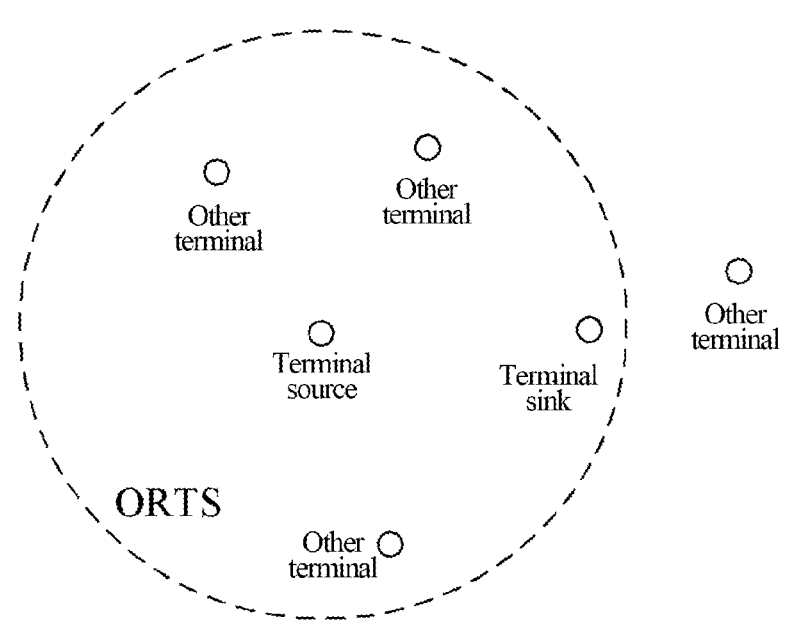
FIG. 4 is a schematic diagram of a terminal source sending ORTS to a terminal sink according to the present document.

As shown in FIG. 4, in the step 201, the terminal source sends the ORTS to the terminal sink in order to establish the communication link, since the ORTS is an omnibearing beam, other terminal devices in the system can also receive the omnibearing request to send, thereby knowing that the communication link will be built in the system, so that the occurrence of conflict can be avoided. On the basis of including contents required by the control frame of the RTS of 802.11, the ORTS carries the location information of the terminal source relative to the mediation device to make the terminal sink acquire the location of the terminal source.

Figure 5:
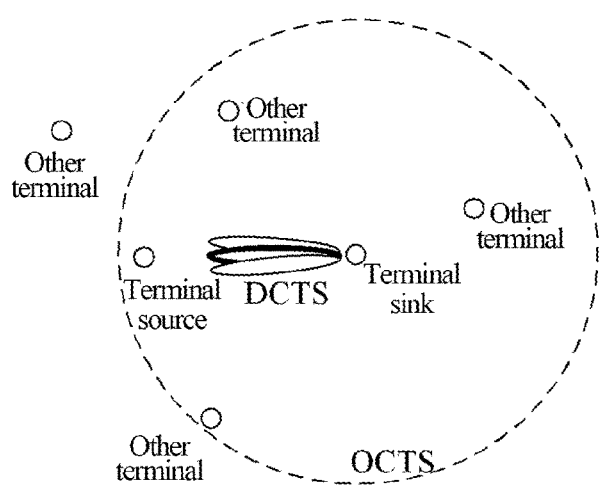
FIG. 5 is a schematic diagram of an MAC control frame response of the terminal sink according to the present document.

As shown in FIG. 5, in the step 204, when the terminal sink sends the directional clear to send to the terminal source through the millimeter wave communication module according to the location information of the terminal source, the terminal sink can send one directional clear to send or a plurality of directional clear to send with different directions within a second angle range ($\pm\sigma$) according to the location information of the terminal source.

The terminal sink sends a plurality of directional clear to send with different directions within the second angle range to ensure that, when the terminal source can receive the DOTS on the condition that the link is not shielded, the corresponding sending order of the plurality of beams can be that each directional beam sent can have an interval of a second beam direction angle increment $\Delta\beta$ with a previous directional beam, and also can be that one of the plurality of directional beams at the interval of $\Delta\beta$ is sent randomly each time; or further can be that a beam direction angle of the interval between each directional beam sent and the previous direction beam is different, and can be partially the same or can be partially different.

The sizes of $\Delta\beta$ and a depend on the system overhead, the larger the a is and the smaller the $\Delta\beta$ is, the more DCTSs are sent, the greater the possibility for the terminal source receiving the DOTS is, and also the larger the system overhead is.

In the step 205, the terminal source can preset a receiving threshold, and after the directional clear to send is received, judges whether the signal reliability judgment parameter of the received directional clear to send is greater than the preset receiving threshold, if the signal reliability judgment parameter of the received directional clear to send is greater than the preset receiving threshold, determines that the received directional clear to send is a reliable directional clear to send; for example, the receiving threshold is set as a certain signal-to-noise ratio value, the signal reliability judgment parameter is a signal-to-noise ratio of the directional clear to send, when the signal-to-noise ratio of the received DOTS is greater than the threshold, the received DOTS is determined as a reliable DOTS, when the terminal source receives a plurality of reliable DCTSs, the terminal source selects the DOTS with the maximum signal-to-noise ratio and records the angle of arrival of its coming beam to determine the direction of the terminal sink.

If the terminal source has received the reliable DOTS, it is illustrated that the 60 GHz LOS link between the terminal source and terminal sink is in good condition, and the terminal source can determine the direction of the terminal sink according to the angle of arrival of the DOTS and establish the 60 GHz LOS link with the terminal sink directly; if the terminal source only has received the OCTS, it is illustrated that the 60 GHz LOS link is shielded, and the terminal source access the relay link using the mediation device as the relay node.

The mediation device and the terminal device already know the location information of each other by the steps of obtaining the location information, in the process of the terminal source establishing a relay link with the terminal sink using the mediation device as the relay node, the millimeter wave communication interaction can be performed both between the terminal source and the mediation device and between the terminal sink and the mediation device according to the location information of the other party by performing signaling interaction, and thus the terminal source can conveniently build the 60 GHz relay link with the mediation device as the relay node.

Figure 6:
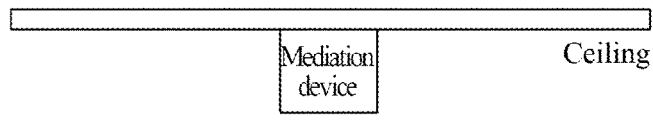
FIG.6 is a schematic diagram of the terminal source establishing an LOS link with the terminal sink according to the present document.
Figure 6:

As shown in FIG. 6, there is no shield between the terminal source and the terminal sink, and it is to establish the LOS link.

Figure 7:
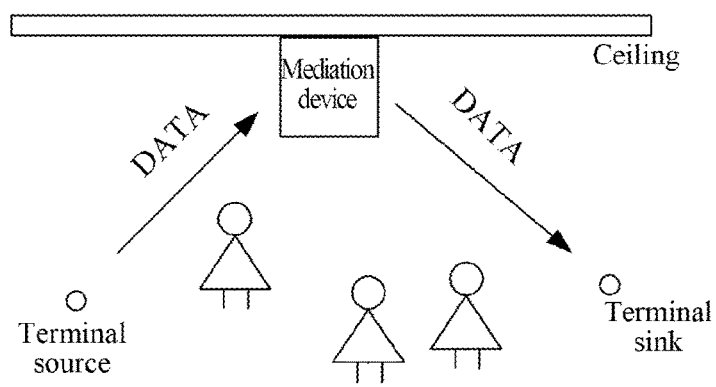
FIG.7 is a schematic diagram of the terminal source establishing a relay link with the terminal sink according to the present document.

As shown in FIG. 7, a human body forms a shield between the terminal source and the terminal sink, and it is to establish the relay link through the mediation device.

Figure 8:
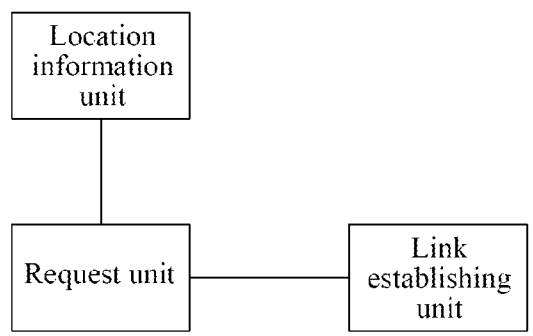
FIG. 8 is an architecture diagram of a terminal device according to one embodiment of the present document.

As shown in FIG. 8, this embodiment further provides a terminal device, comprising: a location information unit, a request unit, and a link establishing unit, wherein:

the location information unit is used for obtaining location information of the terminal device relative to the mediation device by performing the signaling interaction with the mediation device;

the request unit is used for sending the omnibearing request to send to the terminal sink, the location information of the terminal device relative to the mediation device obtained by the location information unit performing signaling interaction with the mediation device being carried in the omnibearing request to send;

the link establishing unit is used for, after the request unit sends the omnibearing request to send, if the directional clear to send sent by the terminal sink according the location information is received, determining the direction of the terminal sink according to the angle of arrival of the directional clear to send, establishing the line of sight link with the terminal sink; if the omnibearing clear to send sent by the terminal sink is only received, establishing the relay link with the terminal sink using the mediation device as the relay node.

The location information unit is specifically used for performing the signaling interaction with the mediation device through the low frequency band communication module, to determine the first angle range; after the first angle range is determined, performing the signaling interaction with the mediation device by the millimeter wave communication module sending a plurality of directional beams with different directions, to determine the location information of the terminal device relative to the mediation device within the first angle range.

The link establishing unit is further used for, after the directional clear to send is received, judging whether the signal reliability judgment parameter of the received directional clear to send is greater than the preset receiving threshold, if the signal reliability judgment parameter of the received directional clear to send is greater than the preset receiving threshold, determining that the received directional clear to send is a reliable directional clear to send; if a plurality of reliable directional clear to send are received, selecting the directional clear to send with the maximum signal reliability judgment parameter, to determine the direction of the terminal sink according to the angle of arrive of the directional clear to send with the maximum signal judgment parameter.

The request unit sends the omnibearing request to send to the terminal sink through the low frequency band communication module;

the link establishing unit establishes the relay link with the terminal sink by establishing the line of sight link with the terminal sink through the millimeter wave communication module or by using the mediation device as the relay mode.

Figure 9:
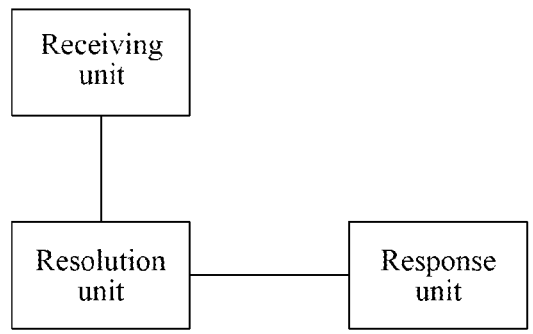
FIG. 9 is an architecture diagram of another terminal device according to one embodiment of the present document.

As shown in FIG. 9, this embodiment provides another terminal device, comprising: a receiving unit, a resolution unit, and a response unit, wherein:

the receiving unit is used for receiving the omnibearing request to send sent by the terminal source;

the resolution unit is used for resolving to obtain the location information of the terminal source relative to the mediation device obtained by the terminal source performing signaling interaction with the mediation device and carried in the omnibearing request to send;

the response unit is used for sending the directional clear to send and sending the omnibearing clear to send to the terminal source according to the location information.

The response unit is specifically used for sending one directional clear to send or a plurality of directional clear to send according to the location information within the second angle range.

The response unit sends the directional clear to send to the terminal source through the millimeter wave communication module; and sends the omnibearing clear to send to the terminal sink through the low frequency band communication module.

The ordinary person skilled in the art can understand that all or part of the steps in the above method can be completed by a program instructing related hardware, and the program can be stored in a computer readable memory medium, such as a read-only memory, disk or optical disk. Alternatively, all or part of the steps in the above embodiments can also be achieved by using one or more integrated circuits. Accordingly, each module/unit in the above embodiments can be implemented in the form of hardware, or can also be implemented in the form of software functional module. The present application is not limited to any particular form of the combination of hardware and software.

The above depiction is only preferred embodiments of the present application and is not used to limit the present document, and for a person skilled in the art, the present application may have various modifications and changes. Any modification, equivalent replacement, and improvement made within the spirit and principle of the present application should be included within the protection scope of the present application.

INDUSTRIAL APPLICABILITY

The advantages of the embodiments of the present document are as follows:

(1) the multi-frequency band physical layer coincides with the evolution line of the millimeter wave communication (60 GHz) standard, which will not increase the overhead of the hardware;

(2) the mediation device mostly is suspended on a high fixed position at indoors, and the terminal device interacts with the mediation device to obtain the location information, avoiding the interference to other devices;

(3) the directional media access control (MAC) protocol with the very narrow beam (DOTS) helps to judge the shielding situation of the line of sight link.

What is claimed is:

1. A method for establishing a millimeter wave wireless communication link, wherein, a terminal source, a mediation device and a terminal sink comprise a low frequency band communication module and a millimeter wave communication module; the method comprising:

the terminal source sending an omnibearing request to send to the terminal sink through the low frequency band communication module, carrying location information of the terminal source relative to the mediation device obtained by the terminal source performing signaling interaction with the mediation device in the omnibearing request to send;

after sending the omnibearing request to send, if a directional clear to send sent by the terminal sink according to the location information is received through the millimeter wave communication module, the terminal source determining a direction of the terminal sink according to an angle of arrival of the directional clear to send, establishing a line of sight link with the terminal sink through the millimeter wave communication module; if an omnibearing clear to send sent by the terminal sink is only received through the low frequency band communication module, the terminal source establishing a relay link with the terminal sink through the millimeter wave communication module using the mediation device as a relay node; wherein the low frequency band communication module is used for communication on a lower-frequency band than a millimeter wave frequency band.

2. The method according to claim 1, wherein, the terminal source obtaining the location information of the terminal source relative to the mediation device by performing the signaling interaction with the mediation device, comprises:
the terminal source performing the signaling interaction with the mediation device through the low frequency band communication module, to determine a first angle range;
after the first angle range is determined, the terminal source performing the signaling interaction with the mediation device by the millimeter wave communication module sending a plurality of directional beams in different directions, to determine the location information of the terminal source relative to the mediation device within the first angle range.

3. The method according to claim 2, wherein, the terminal source obtaining the location information of the terminal source relative to the mediation device by performing signaling interaction with the mediation device is performed in the following one or more situations:
when the terminal source accesses a system network:
when the terminal signal source performs periodically, to reach a performing period;
when the terminal source detects that a displacement occurs;
when a user equipment initiates a request to send.

4. The method according to claim 1, further comprising:
after receiving the directional clear to send, the terminal source judging whether a signal reliability judgment parameter of the received directional clear to send is greater than a preset receiving threshold, and if the signal reliability judgment parameter of the received directional clear to send is greater than the preset receiving threshold, determining that the received directional clear to send is a reliable directional clear to send;
if the terminal source receives a plurality of reliable directional clear to send, the terminal source selecting a directional clear to send with a maximum signal reliability judgment parameter, and determining the direction of the terminal sink according to the angle of arrive of the directional clear to send with the maximum signal reliability judgment parameter.

5. The method according to claim 1, wherein,
in the process of the terminal source establishing the relay link with the terminal sink using the mediation device as the relay node, millimeter wave communication is performed both between the terminal source and the mediation device and between the terminal sink and the mediation device according to the location information of the terminal source relative to the mediation device obtained by performing the signaling interaction.

6. The method according to claim 1, wherein,
the terminal source sends the omnibearing request to send to the terminal sink through a low frequency band communication module; establishes the relay link with the terminal sink by establishing the line of sight link with the terminal sink through a millimeter wave communication module or by using the mediation device as the relay mode.

7. A method for establishing a millimeter wave wireless communication link, wherein, a terminal source, a mediation device and a terminal sink comprise a low frequency band communication module and a millimeter wave communication module; the method comprising:
the terminal sink receiving an omnibearing request to send sent by the terminal source through the low frequency band communication module, resolving to obtain location information of the terminal source relative to the mediation device obtained by the terminal source performing signaling interaction with the mediation device and carried in the omnibearing request to send;
the terminal sink sending a directional clear to send through the millimeter wave communication module, and sending an omnibearing clear to send to the terminal source through the low frequency band communication module according to the location information;
if the direction clear to send is received through the millimeter wave communication module, the terminal source determining a direction of the terminal device according to an angle of arrival of the directional clear to send, establishing a line of sight link with the terminal sink through the millimeter wave communication module; if the omnidirectional clear to send is only received through the low frequency band communication module, the terminal source establishing a relay link with the terminal sink through the millimeter wave communication module using the mediation device as a relay node;
wherein the low frequency band communication module is used for communication on a lower-frequency band than a millimeter wave frequency band.

8. The method according to claim 7, the terminal sink sending the directional clear to send to the terminal source according the location information, comprises:
the terminal sink sending one directional clear to send or sending a plurality of directional clear to send in different directions according to the location information within a second angle range.

9. A terminal device comprising hardware configured to execute instructions stored in a non-transitory computer readable medium to execute steps in following units:
a location information unit, a request unit, and a link establishing unit, wherein: the terminal device, a terminal sink and a mediation device comprise a low frequency band communication module and a millimeter wave communication module;
the location information unit is configured to obtain location information of the terminal device relative to the mediation device by performing signaling interaction with the mediation device;
the request unit is configured to send an omnibearing request to send to the terminal sink through the low frequency band communication module, carrying the location information of the terminal device relative to the mediation device obtained by the location information unit performing signaling interaction with the mediation device in the omnibearing request to send;
the link establishing unit is configured to, after the request unit sends the omnibearing request to send, if a directional clear to send sent by the terminal sink according the location information is received through the millimeter wave communication module, determine a direction of the terminal sink according to an angle of arrival of the directional clear to send, establish a line of sight link with the terminal sink through the millimeter wave communication module; if an omnibearing clear to send sent by the terminal sink is only received through the low frequency band communication module, establish a relay link with the terminal sink through the millimeter wave communication module using the mediation device as a relay node; wherein the low frequency band communication module is used for communication on a lower-frequency band than a millimeter wave frequency band.

10. The device according to claim 9, wherein,
the location information unit is configured to perform the signaling interaction with the mediation device through the low frequency band communication module, to determine a first angle range; after the first angle range is determined, perform the signaling interaction with the mediation device by the millimeter wave communication module sending a plurality of directional beams in different directions, to determine the location information of the terminal device relative to the mediation device within the first angle range.

11. The device according to claim 9, wherein,
the link establishing unit is further configured to, after the directional clear to send is received, judge whether a signal reliability judgment parameter of the received directional clear to send is greater than a preset receiving threshold, if the signal reliability judgment parameter of the received directional clear to send is greater than the preset receiving threshold, determine that the received directional clear to send is a reliable directional clear to send; if a plurality of reliable directional clear to send are received, select a directional clear to send with a maximum signal reliability judgment parameter, to determine the direction of the terminal sink according to the angle of arrival of the directional clear to send with the maximum signal reliability judgment parameter.

12. The device according to claim 9, wherein,
the request unit is configured to send the omnibearing request to send to the terminal sink through the low frequency band communication module;
the link establishing unit is configured to establish the relay link with the terminal sink by the millimeter wave communication module establishing the line of sight link with the terminal sink or by using the mediation device as the relay mode.

13. A terminal device, comprising hardware configured to execute instructions stored in a non-transitory computer readable medium to execute steps in following units:
a receiving unit, a resolution unit, and a response unit, wherein: the terminal device, a terminal source and a mediation device comprise a low frequency band communication module and a millimeter wave communication module;
the receiving unit is configured to receive an omnibearing request to send sent by the terminal source through the low frequency band communication module;
the resolution unit is configured to resolve to obtain location information of the terminal source relative to the mediation device obtained by the terminal source performing signaling interaction with the mediation device and carried in the omnibearing request to send;
the response unit is configured to send a directional clear to send to the terminal source through the millimeter wave communication module, and send an omnibearing clear to send to the terminal source through the low frequency band communication module according to the location information; wherein, if the direction clear to send is received through the millimeter wave communication module, the terminal source determines a direction of the terminal device according to an angle of arrival of the directional clear to send, establishes a line of sight link with the terminal device through the millimeter wave communication module; if the omnidirectional clear to send is only received through the low frequency band communication module, the terminal source establishes a relay link with the terminal device through the millimeter wave communication module using the mediation device as a relay node;
wherein the low frequency band communication module is used for communication on a lower-frequency band than a millimeter wave frequency band.

14. The device according to claim 13, wherein,
the response unit is configured to send one directional clear to send or send a plurality of directional clear to send in different directions according to the location information within a second angle range.

* * * * *